Aug. 7, 1962    G. W. BERNHEIM    3,048,833
PHOTOELECTRIC CONTROL DEVICE FOR STREET LIGHTS
Filed May 13, 1960
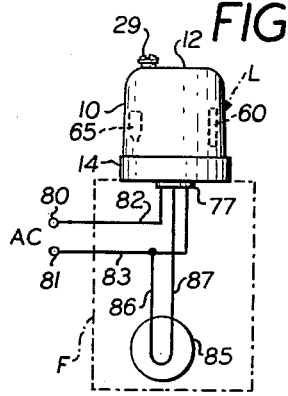
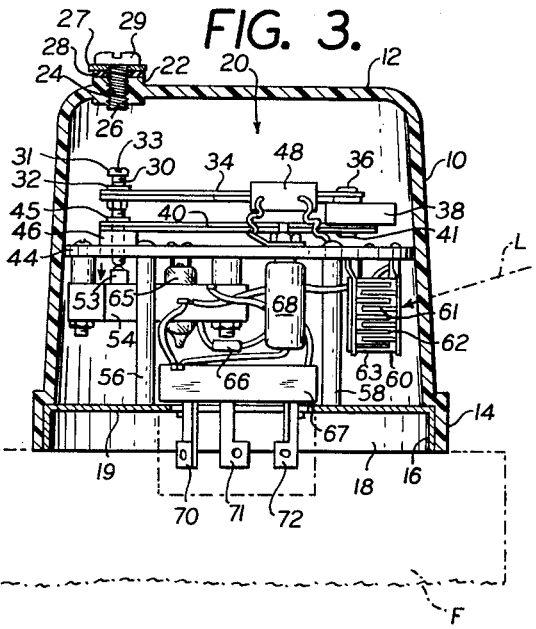
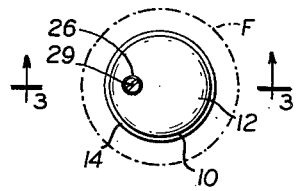
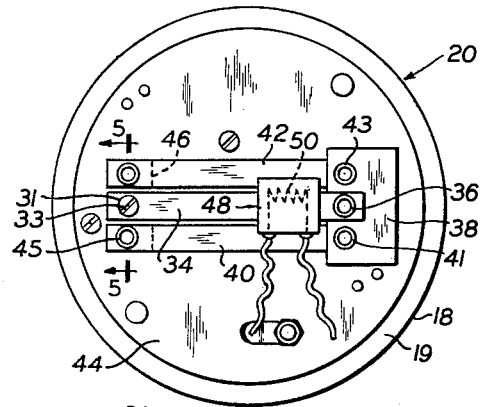
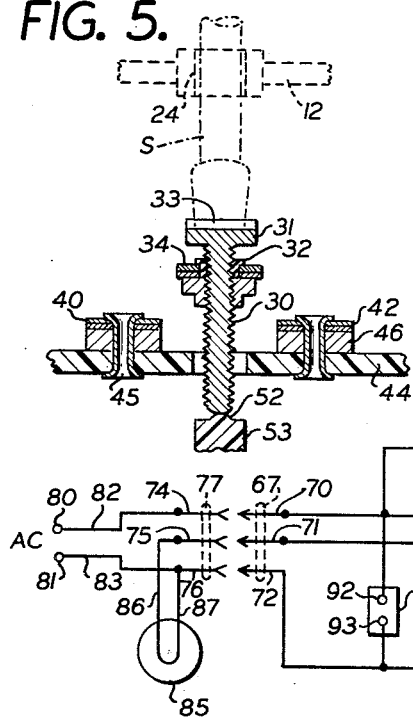
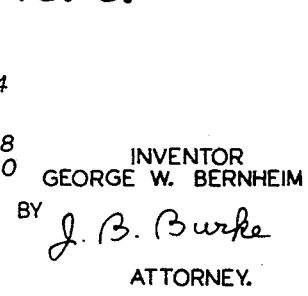
INVENTOR
GEORGE W. BERNHEIM
BY J. B. Burke
ATTORNEY.

3,048,833
PHOTOELECTRIC CONTROL DEVICE FOR STREET LIGHTS
George W. Bernheim, Bronx, N.Y.
(% Vericontrol Associates, 72 Main St., Yonkers, N.Y.)
Filed May 13, 1960, Ser. No. 28,961
2 Claims. (Cl. 340—228)

This invention concerns an improved photoelectric control device for street lights and other loads, and more particularly relates to a photoelectrically controlled switching circuit for opening and closing a load circuit in response to ambient light conditions.

It has been known heretofore to provide a street light with a switching circuit controlled by a photoelectric device for automatically turning the light on at dusk and turning it off at dawn. Such street light control devices have generally been mounted on lamp posts adjacent to the lamps. One difficulty commonly encountered has been the impossibility of determining at a glance from street level whether the cause of light failure when a lamp failed to light at dusk, was in the lamp or in the photoelectric control device. Another difficulty encountered has been the lack of a quick and certain means for adjusting the photoelectric control device while mounted on the lamp post so that it responded to predetermined ambient light conditions. The prior known photoelectric devices generally had to be demounted from the lamp post and sent to a repair shop. Recalibration of the prior photoelectric devices necessitated by changing response characteristics components of the devices always involved slow, uncertain trial and error methods.

The present invention is directed at overcoming the above and other disadvantages of prior photoelectric control devices. The invention has as objects: provision of a photoelectric control switching device for a street lamp or other load, which device can be accurately calibrated while installed on a lamp post or other support; provision of a photoelectric controlled switching device with an externally accessible calibration adjustment means to respond to light of predetermined intensity; provision of a neon lamp or other type of space discharge tube in circuit with a photoelectric control device and street lamp, the neon lamp becoming illuminated when the photoelectric device is operative even though the street lamp may be out of order, the lighted neon lamp being visible from street level so that a serviceman can determine at a glance with certainty if the street lamp is out of order; provision of a neon lamp in a photoelectric switching device to serve as a calibration indicator indicating adjustment of the device for response to predetermined ambient light levels; provision of a screw adjusted switch and thermal relay in circuit with a neon lamp in a photoelectric switching device for calibrating the device to respond at predetermined ambient light levels; provision of a neon lamp in a load circuit of a photoelectric switching device for the load circuit to indicate when the load circuit is inoperative. Other and further objects and advantages of the invention will become apparent from the following detailed description taken together with the drawing wherein:

FIG. 1 is an elevational view of a photoelectric switching device embodying the invention, with associated components shown schematically.

FIG. 2 is a top plan view of the device of FIG. 1.

FIG. 3 is a vertical sectional view on an enlarged scale taken on line 3—3 of FIG. 2.

FIG. 4 is a top plan view of an internal assembly of the device.

FIG. 5 is a fragmentary sectional view on a further enlarged scale taken on line 5—5 of FIG. 4.

FIG. 6 is a schematic diagram of a circuit according to the invention.

Referring to the drawing, there is shown in FIGS. 1, 2 and 3 a generally cylindrical canopy 10 formed of translucent plastic material. The canopy has a closed top wall 12 and an open bottom formed with an annular skirt 14 defining a recess 16 in which fits the cylindrical skirt 18 depending from circular base 19 of a chassis assembly 20, best shown in FIGS. 3 and 4. The canopy is formed with a boss 22 in its top wall 12. The boss has a hole 24 which is normally closed by a removable stopper such as screw 26. Metal and rubber washers 27, 28 seal the hole 24 under the head 29 of the screw.

Axially aligned with the hole 24 is a screw 30 which is the adjustment screw of the device. Screw 30 as best shown in FIGS. 3, 4 and 5, is carried in a threaded eyelet 32 seated in a hole in the end of a bimetallic element 34. This element is secured by eyelet or rivet 36 to a mounting plate 38. Plate 38 is supported by two spaced temperature compensating spaced bimetallic elements 40, 42. Elements 40, 42 respond to ambient temperature changes by bending so that bending of element 34 due to ambient temperature changes is compensated. Eyelets or rivets 41, 43 secure plate 38 to ends of elements 40, 42. Opposite ends of elements 40, 42 are secured by rivets or eyelets 45 to a circular platform plate 44. Plate 44 fits snugly against the inner rather conical wall of the canopy 10. Spacer members 46 space elements 40, 42 from the platform; see FIGS. 3 and 5. A block 48 including a wire resistance heater coil 50 is disposed adjustably on element 34 adjacent to plate 38. The head 31 of screw 30 is slotted at 33 for receiving a blade of a screwdriver S, the shank of which is passed through hole 24 in the canopy wall 12 as indicated by dotted lines in FIG. 5. The screwdriver S can be used to turn the screw 30 so that its end bears down to a greater or lesser extent on tip 52 of an operating button 53 of switch 54.

A pair of posts 56, 58 are secured between base 19 and plate 44 to hold these members in fixed spaced parallel disposition. Secured to the underside of plate 44 and depending therefrom is a photoconductive element 60 having electrodes 61, 62 arranged in interdigital configuration on a photosensitive coating 63 of the element 60. This element is disposed for exposure to ambient light, especially sky light, through the translucent wall of the canopy. Light impinging on the canopy diffuses uniformly therethrough to illuminate the element 60 uniformly.

A neon lamp or similar space discharge gas tube is shown at 65. This lamp is suspended from plate 44 and is disposed near the cylindrical wall of the canopy. When this lamp is lit it glows with a red light which diffuses throughout the canopy and is visible a considerable distance therefrom. A resistor 66 is connected in series with lamp 65 to limit current therethrough. Also suspended from plate 44 is a spark gap type of line protector 68 which protects the device against high voltages and current surges which might otherwise damage element 60 and other components of the device. A cylindrical plug 67 having three prongs 70, 71, 72 is secured to the upper side of base 19. An opening 69 is formed in the base through which protrude the three prongs. These prongs are adapted to engage with contacts 74, 75, 76 in a female receptacle or socket 77 indicated schematically in FIG. 6 and shown in FIG. 1.

Reference is now made to FIGS. 1 and 6 in which the several components described are shown schematically connected in a circuit according to the invention. An external power supply is applied at terminals 80, 81 which are connected via wires 82, 83 to contacts 74, 75 of the receptacle or socket 77. A lamp 85 is connected via wires 86 and 87 to contacts 75 and 76 respectively. Prongs 70–72 connect with contacts 74–76 respectively. The photosensitive cell 60 is equivalent to a variable resistor which is in series with prong 70, resistance heater coil 50 and prong 72. Switch 54 has contact 88 connected to prong 70 via wire 87. Contact 89 is connected to prong 71 via wire 90. This switch is normally closed and contacts 88, 89 are short circuited. The end of screw 31 abuts the button 53 of the switch 54. Neon tube 65 is in series with resistor 66 and both components are connected between wires 90 and 91 which terminate at prongs 71, 72 respectively. Circuit protector 68 includes two electrodes 92, 93 separated by a spark gap and connected to wires 87 and 91 respectively.

The canopy 10, mounted on the chassis 20 assembled as shown in FIGS. 1–4, and connected as shown in FIGS. 1 and 6, will normally be mounted on a street lamp fixture F shown in dotted lines in FIG. 1. The lamp 85 will also be carried by the fixture but will be so disposed that it sheds no light upon the photoelectric cell 60.

In operation of the device, the lamp 85 will be extinguished by day. Lamp 65 will also be extinguished. Ambient light L impinging on the cell 60 through the canopy 10 will reduce its internal electrical resistance to a very low amount. Thus a current will flow through heater 50, energizing the heater and causing bimetallic element 34 to bend so that pressure of screw 31 on button 53 opens contacts 88, 89 electrically, thereby opening the power supply circuit lamps 65 and 85. Suppose now that the ambient light decreases as dusk approaches. This will decrease the light on the photoconductive cell 60, increasing its resistance and reducing the current in resistance heater 50, cooling off the heater and allowing the element 34 to decrease pressure on button 53 so that contacts 88, 89 close electrically. This closes the power supply circuit of lamp 85 which then lights up along with lamp 65. The thermal relay including heater 50 and element 34 requires normally a few minutes to respond to changes in the heater current. This provides a lag in response of the switching circuit so that momentary changes in light level do not cause lamps to light up or extinguish. Thus if an automobile should momentarily cast a strong headlight beam on the device at night, the lamp 85 will not extinguish because of the lag in response of the thermal relay.

Suppose now that the lamp 85 develops a defect such as looseness in its socket, a burned out filament or the like. Lamp 85 will not light up when contacts 88, 89 close. However lamp 65 will light up because full voltage is applied across the lamp 65 through resistor 66 due to the open circuit condition of lamp 85. The lighting of lamp 65 indicates that the photoconductive cell, heater and switch are operating normally but that the lamp 85 is open circuited or inoperative. A serviceman, noting that lamp 65 is lit while lamp 85 is unlit need then only turn his attention to servicing the lamp 85 to render the street light operative again.

As dawn approaches, the ambient light gradually increases while the resistance of cell 60 is gradually lowered due to increase in illumination thereof by the ambient light. Current through heater 50 increases until element 34 and screw 31 cause switch 54 to open and extinguish the lamps 65 and 85. Member 68 protects the photoelectric cell, heater and associated components of the circuit in the event of a high voltage or current surge by discharging across electrodes 92, 93.

In order to adjust the circuit so that the lamp 85 will light at dusk earlier, that is, at a higher light level, it is only necessary to remove screw 26 from the canopy, insert a screwdriver through hole 24 and turn screw 30. This adjusts the pressure on switch button 53. The screwdriver will be turned until switch 54 closes and the neon lamp 65 lights. This adjustment can be performed even in the absence of lamp 85. The circuit can similarly be adjusted to turn lamp 85 off at a later time at dawn, that is at a higher ambient light level. This is done by turning screw 30 and adjusting the pressure on switch button 53 until the switch 54 opens and neon lamp 65 extinguishes. This adjustment can also be performed in the absence of lamp 85. When an adjustment is made to obtain a response of the switching circuit with a higher or lower light level at dawn or dusk, this adjustment will also be effective to produce a response at a higher or lower light level at dusk and dawn respectively. The adjustment should always be done with the canopy in place, since the presence of the canopy affects the intensity of the light reaching the cell 60. If the adjustment were made with the canopy off the chassis, the response of the circuit would occur at a different light level with the canopy on the chassis.

Although the invention has been described with particular reference to a lamp 85 in the load circuit, it will be apparent that other electrical loads could be inserted instead in circuit 86, 87. Instead of an incandescent lamp, a fluorescent lamp or mercury vapor lamp in series with a suitable ballast transformer or choke could be substituted in the load circuit 86, 87. Regardless of the type of load connected in circuit 86, 87, it will be noted that the load will be switched in and out of the circuit as switch 54 is closed and opened respectively under control of the photoelectric switching circuit.

What is claimed and sought to be protected by Letters Patent is:

1. A photoelectric controlled device for a street light assembly having a terminal socket for power supply and illuminating lamp circuits, comprising a base, a translucent canopy mounted over said base, a stopper removably mounted in an aperture in said canopy, and switching means on said base comprising in combination: a plurality of prongs extending from said base for engaging in said socket, one of said prongs providing a first terminal of the illuminating lamp circuit, two others of said prongs providing second and third other terminals of the power supply circuit, a switch having two fixed contacts connected respectively to the first and second terminals, said switch having a movable contact normally bridging the fixed contacts to close the switch, a pushbutton connected to the movable contact for moving the same to open the switch, a neon indicator lamp connected between the first and third terminals and supported adjacent the canopy, said indicator lamp being energized in a circuit including the fixed and movable contacts; a bendable bimetallic element, an adjustable screw carried at one end of said bimetallic element in axial alignment with said stopper and aperture, said screw having one end abutting said pushbutton and controlling movement thereof when the bimetallic element bends, a resistance heater electrically insulated from said bimetallic element and mounted thereon for bending the bimetallic element when the heater is energized, said heater having one end connected to said third terminal, and a photoconductive cell supported adjacent to the canopy, said cell having an internal resistance responsive to impingement of ambient light thereon passing through the canopy, said cell being connected to the other end of the resistance heater and to the said second terminal, whereby adjustment of said screw by a tool inserted through said aperture while the canopy is on the base to turn said indicator lamp on or off determines the intensity of light required to pass through the canopy to the cell for effecting closing or opening of the switch and said illuminating lamp circuit.

2. A photoelectric controlled device for a street light assembly having a terminal socket for power supply and illuminating lamp circuits, comprising a base, a switching means on said base, said switching means comprising a plurality of prongs extending from said base for engaging in said socket, one of said prongs providing a first terminal of the illuminating lamp circuit, two others of said prongs providing second and third other terminals of the power supply circuit, a switch having two fixed contacts connected respectively to the first and second terminals, said switch having a movable contact normally bridging the fixed contacts to close the switch, a pushbutton connected to the movable contact for moving the same to open the switch, a neon tube indicator lamp connected between the first and third terminals, said indicator lamp being energized in a circuit including the fixed and movable contacts, a thermal relay having a bendable bimetallic element, an adjustable screw carried at one end of said element and having one end abutting said pushbutton to control movement thereof when the bimetallic element bends, a resistance heater electrically insulated from said bimetallic element and mounted thereon for bending the bimetallic element when the heater is energized, said heater having one end connected to said third terminal, and a photoconductive cell having an internal resistance responsive to impingement of ambient light thereon, said cell being connected to the other end of the resistance heater and to the second terminal, whereby adjustment of said screw to turn said indicator lamp on or off determines the intensity of ambient light required to impinge upon the cell for effecting closing or opening respectively of said switch and said illuminating lamp circuit, and whereby the lighting of said indicator lamp indicates that the switch is closed independently of any illuminating lamp connected to the illuminating lamp circuit.

References Cited in the file of this patent

UNITED STATES PATENTS

| | | |
|---|---|---|
| 996,489 | Key | June 27, 1911 |
| 1,466,110 | Beckwith et al. | Aug. 28, 1923 |
| 1,618,816 | Davies | Feb. 22, 1927 |
| 2,447,749 | Hallett | Aug. 24, 1948 |
| 2,461,962 | Carlson | Feb. 15, 1949 |
| 2,477,172 | Brownlow | July 26, 1949 |
| 2,709,224 | Garnick | May 24, 1955 |
| 2,757,317 | Harlan | July 31, 1956 |
| 2,900,520 | Frank | Aug. 18, 1959 |

FOREIGN PATENTS

| | | |
|---|---|---|
| 636,821 | Great Britain | May 10, 1950 |